(12) United States Patent
Sekine et al.

(10) Patent No.: US 10,800,048 B2
(45) Date of Patent: Oct. 13, 2020

(54) ROBOT (71) Applicant: Seiko Epson Corporation, Tokyo (JP)

(72) Inventors: Kotaro Sekine, Azumino (JP); Ryosuke Teranaka, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/194,699

(22) Filed: Nov. 19, 2018

(65) Prior Publication Data
US 2019/0152070 A1 May 23, 2019

(30) Foreign Application Priority Data

Nov. 20, 2017 (JP) ................................ 2017-222482

(51) Int. Cl.
B25J 19/00 (2006.01)
H02P 3/12 (2006.01)

(52) U.S. Cl.
CPC ............ B25J 19/0004 (2013.01); H02P 3/12 (2013.01)

(58) Field of Classification Search
CPC ........... B25J 19/00; B25J 19/0004; H02P 3/12
USPC ........................................................ 318/375
See application file for complete search history.

(56) References Cited

U.S. PATENT DOCUMENTS

| 6,791,291 | B2 * | 9/2004 | Shimizu | B25J 9/1615 |
| | | | | 318/568.1 |
| 9,168,660 | B2 * | 10/2015 | Sato | B25J 9/042 |
| 2005/0087034 | A1 * | 4/2005 | Friedrich | B25J 9/044 |
| | | | | 74/490.03 |
| 2006/0210013 | A1 * | 9/2006 | Kasuya | A61B 6/035 |
| | | | | 378/4 |
| 2009/0105877 | A1 * | 4/2009 | Hellstrom | B25J 19/0004 |
| | | | | 700/245 |
| 2010/0050806 | A1 * | 3/2010 | Ono | B25J 9/044 |
| | | | | 74/490.02 |
| 2011/0232513 | A1 * | 9/2011 | Bosga | B30B 1/266 |
| | | | | 100/48 |
| 2013/0221888 | A1 * | 8/2013 | Horikoshi | H02P 27/06 |
| | | | | 318/400.29 |
| 2014/0001165 | A1 * | 1/2014 | Takemoto | B23K 9/007 |
| | | | | 219/127 |
| 2014/0109712 | A1 * | 4/2014 | Ono | B25J 9/042 |
| | | | | 74/490.02 |
| 2014/0203741 | A1 * | 7/2014 | Ohfuchi | H02P 3/12 |
| | | | | 318/380 |
| 2015/0114160 | A1 * | 4/2015 | Sato | B25J 9/042 |
| | | | | 74/490.01 |
| 2015/0321344 | A1 * | 11/2015 | Hahakura | B25J 19/04 |
| | | | | 74/490.02 |
| 2016/0064263 | A1 * | 3/2016 | Hosek | B25J 11/0095 |
| | | | | 414/744.5 |

(Continued)

FOREIGN PATENT DOCUMENTS

| JP | 2011-177845 A | 9/2011 |
| JP | 2014-140914 A | 8/2014 |

Primary Examiner — Kawing Chan
(74) Attorney, Agent, or Firm — Harness, Dickey & Pierce, P.L.C.

(57) ABSTRACT

A robot includes a robot housing containing a robot control apparatus that controls the robot having a motor, a brake that brakes the motor by short-circuiting between power lines for supplying electric power to the motor, and a conversion element that converts a current generated by braking of the motor by the brake into heat, wherein the conversion element is attached to the robot housing.

11 Claims, 2 Drawing Sheets (56) References Cited

U.S. PATENT DOCUMENTS

2017/0155344 A1* 6/2017 Nishino .................. G05B 9/02

* cited by examiner

ROBOT

BACKGROUND

1. Technical Field

The present invention relates to a robot.

2. Related Art

Research and development of control apparatuses that control robots are carried out.

In this regard, a robot controlled by an external control apparatus is known (see Patent Document 1 (JP-A-2011-177845)).

Here, in the case where a robot is controlled by an external control apparatus, the installation area (footprint) for installation of the robot and the control apparatus may be larger, and the installation location may be restricted. On the other hand, in the case where a robot is controlled by a control apparatus built in the robot, the installation area is smaller. However, in this case, heat generated from a part as a heat source of the parts of the control apparatus within the robot may cause a failure in part of the robot and the control apparatus.

SUMMARY

An aspect of the invention is directed to a robot including a robot housing containing a robot control apparatus that controls the robot having a drive unit, a braking unit that brakes the drive unit by short-circuiting between power lines for supplying electric power to the drive unit, and a conversion element that converts a current generated by braking of the drive unit by the braking unit into heat, wherein the conversion element is attached to the robot housing.

With this configuration, in the robot, increase in installation area can be suppressed and a temperature rise inside of the robot housing with a temperature rise of the conversion element may be suppressed.

In another aspect of the invention, the robot may be configured such that the conversion element is not attached to any of one or more boards of the robot control apparatus.

With this configuration, in the robot, a temperature rise of the one or more boards of the robot control apparatus with the temperature rise of the conversion element can be suppressed.

In another aspect of the invention, the robot may be configured such that the conversion element is attached to the robot housing by an attachment member as a member that attaches the conversion element to the robot housing.

With this configuration, in the robot, the temperature rise inside of the robot housing with the temperature rise of the conversion element can be suppressed by heat conduction between the conversion element and the robot housing.

In another aspect of the invention, the robot may be configured such that the conversion element and the robot housing are separated.

With this configuration, in the robot, the temperature rise inside of the robot housing with the temperature rise of the conversion element can be suppressed by the heat conduction between the conversion element and the robot housing via the attachment member.

In another aspect of the invention, the robot may be configured such that the conversion element and the robot housing are in contact.

With this configuration, in the robot, the temperature rise inside of the robot housing with the temperature rise of the conversion element can be suppressed by respective heat conduction between the conversion element and the robot housing, heat conduction between the conversion element and the attachment member, and heat conduction between the attachment member and the robot housing.

In another aspect of the invention, the robot may be configured such that the conversion element is in contact with a heat dissipation sheet and the heat dissipation sheet is in contact with the robot housing.

With this configuration, in the robot, the temperature rise inside of the robot housing with the temperature rise of the conversion element can be suppressed more reliably by the heat dissipation sheet.

In another aspect of the invention, the robot may be configured such that the conversion element is a resistor.

With this configuration, in the robot, the increase in installation area can be suppressed, and the temperature rise inside of the robot housing with a temperature rise of the resistor can be suppressed by heat conduction between the resistor and the robot housing.

In another aspect of the invention, the robot may be configured such that a base and a movable unit provided on the base are provided, and the robot housing includes a housing of the base and a housing of the movable unit and the conversion element is attached to the housing of the base.

With this configuration, in the robot, the temperature rise inside of the robot housing with the temperature rise of the conversion element can be suppressed more reliably by heat conduction between the conversion element and the housing of the base.

In another aspect of the invention, the robot may be configured such that the conversion element is attached to a bottom surface of the housing of the base.

With this configuration, in the robot, the temperature rise inside of the robot housing with the temperature rise of the conversion element can be suppressed more reliably by heat conduction between the conversion element and the bottom surface of the housing of the base.

In another aspect of the invention, the robot may be configured such that the base includes a first base and a second base, the second base is provided on a first surface as a part of a surface on a side in a first direction as a direction associated with the first base of surfaces of the first base, a gap is formed between a second surface as a surface different from the first surface of the surface on the side in the first direction of the surfaces of the first base and the second base, the movable unit is provided on the second surface or second base in the gap, and a connection part that can be connected to a teaching apparatus is provided in a region between the second surface and the bottom surface of the housing of the first base when a back surface of the housing of the first base is seen in a direction orthogonal to the back surface of a region of the back surface.

With this configuration, in the robot, a movable range of the movable unit can be expanded.

In another aspect of the invention, the robot may be configured such that the conversion element is located inside of the robot housing.

With this configuration, in the robot, contact between another object outside of the robot and the conversion element can be suppressed.

In another aspect of the invention, the robot may be configured such that a contact suppression member located between the conversion element and a wire member is provided.

With this configuration, in the robot, a temperature rise of the wire member with the temperature rise of the conversion element can be suppressed by the contact suppression member.

In another aspect of the invention, the robot may be configured such that the attachment member is located between the conversion element and the wire member.

With this configuration, in the robot, the temperature rise of the wire member with the temperature rise of the conversion element can be suppressed by the attachment member.

In another aspect of the invention, the robot may be configured such that a resistance value of the conversion element is from 2Ω to 1 kΩ.

With this configuration, in the robot, the temperature rise inside of the robot housing with the temperature rise of the conversion element can be suppressed by heat conduction between the conversion element having the resistance value from 2Ω to 1 kΩ and the robot housing.

In another aspect of the invention, the robot may be configured such that a plurality of the drive units are provided, and the braking unit brakes the respective plurality of drive units by short-circuiting between the power lines for supplying electric power to the drive units and the conversion element converts the currents generated by braking of the respective plurality of drive units by the braking unit into heat.

With this configuration, regarding the robot, at least part of reduction in weight, suppression of increase in manufacturing cost, and reduction in size can be realized.

BRIEF DESCRIPTION OF THE DRAWINGS

The invention will be described with reference to the accompanying drawings, wherein like numbers reference like elements.

FIG. 2 shows an example of a conversion element RE attached to a robot housing by an attachment member AT.

DESCRIPTION OF EXEMPLARY EMBODIMENTS

Embodiment

As below, an embodiment of the invention will be explained with reference to the drawings. Note that, hereinafter, a housing of a certain member refers to a metal box-shaped object (or a frame-shaped object) that forms the outer shape of the member.
Configuration of Robot First, a configuration of a robot 1 will be explained.

Figure 1:
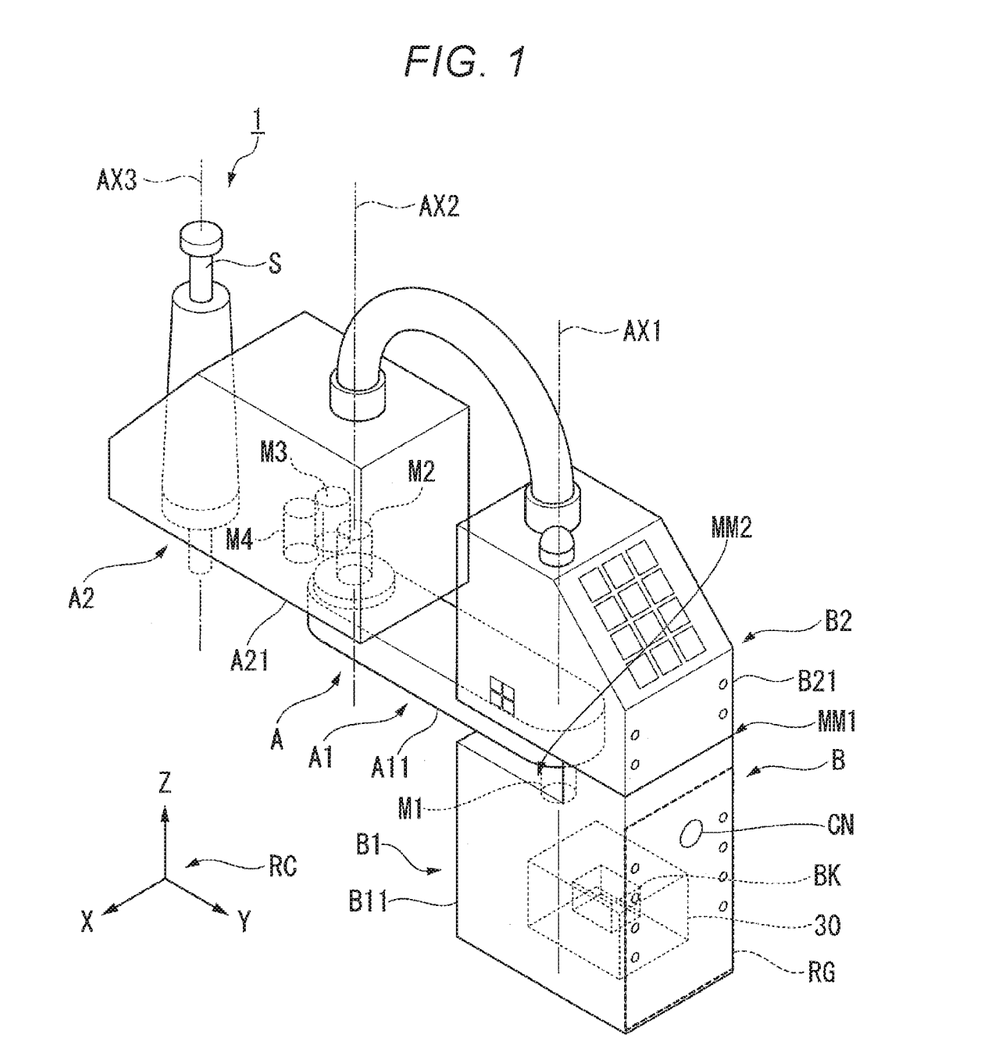
FIG. 1 shows an example of a configuration of a robot 1 according to an embodiment.

FIG. 1 shows an example of the configuration of the robot 1 according to the embodiment. The robot 1 is e.g. a scalar (horizontal articulated) robot. Note that the robot 1 may be another robot such as a vertical articulated robot or Cartesian coordinate robot in place of the scalar robot. The vertical articulated robot may be a single-arm robot having a single arm, a dual-arm robot having two arms (multi-arm robot having two arms), or a multi-arm robot having three or more arms. The Cartesian coordinate robot is e.g. a gantry robot.

The robot 1 includes a base B installed on an installation surface and a movable unit A supported by the base B. The installation surface refers to a surface on which the robot 1 is installed such as a floor surface of a room in which the robot 1 is installed, a wall surface of the room, a ceiling surface of the room, an outdoor ground surface, a top surface of a table, or a top surface of a bench. Hereinafter, for convenience of explanation, a direction orthogonal to the installation surface from the center of gravity of the robot 1 toward the installation surface is referred to as "lower" or "downward direction" and a direction opposite to the direction is referred to as "upper" or "upward direction". Further, as below, as an example, the case where the downward direction coincides with both a negative direction of a Z-axis in a robot coordinate system RC as a robot coordinate system of the robot 1 and the direction of gravity will be explained. Note that the downward direction may not necessarily coincide with one or both of the negative direction and the gravity direction instead.

The base B is formed by two parts. One of the parts is a first base B1 and the other is a second base B2. Note that the space inside of the first base B1 connects to the space inside of the second base B2.

The first base B1 is installed on the above described installation surface. The first base B1 includes at least a housing B11 as a housing of the first base B1. The housing B11 has a nearly rectangular parallelepiped shape (or cubic shape) as an outer shape, includes plate-like surfaces, and is hollow. The second base B2 is provided on (fixed to) a surface MM1 as a part of the surface on a side in a first direction as a direction associated with the first base B1 of the surfaces of the first base B1 (i.e., the surfaces of the housing B11). As below, as an example, the case where the first direction is a direction that coincides with the upward direction when the first base B1 is installed on the installation surface will be explained. Accordingly, hereinafter, for convenience of explanation, the surface on the side in the first direction as the direction associated with the first base B1 of the surfaces of the first base B1 is referred to as "upper surface" of the first base B1 (i.e., "upper surface" of the housing B11). That is, in the example, the surface MM1 is a part of the upper surface of the first base B1. Further, when the first base B1 is installed on the installation surface, the upper surface of the first base B1 is an opposite surface to the lower surface of the first base B1 as a surface in surface contact with the installation surface of the surfaces of the first base B1. The distance between a surface MM2 as the other part than the surface MM1 of the upper surface of the first base B1 and the lower surface of the first base B1 is shorter than the distance between the surface MM1 and the lower surface of the first base B1. Accordingly, a gap exists between the surface MM2 and the second base B2. Furthermore, in the example, the movable unit A is provided on the surface MM2. That is, the first base B1 supports the movable unit A. Note that the shape of the first base B1 (i.e., the shape of the housing B11) may be another shape as long as the second base B2 may be fixed to a part of the upper surface of the first base B1 in place of the shape. Or, the movable unit A may have a configuration provided on a surface of the second base B2 opposed to the surface MM2 in the gap in place of the configuration supported by the first base B1. Or, the first direction may be a direction that coincides with another direction when the first base B1 is installed on the installation surface in place of the direction that coincides with the upward direction.

As described above, the second base B2 is provided on the surface MM1 of the housing B11. The second base B2 includes at least a housing B21 as a housing of the second base B2. The housing B21 has a shape as an outer shape formed by cutting off to remove triangular portions containing single vertexes in two surfaces forming a rectangular parallelepiped shape (or cubic shape) and opposed to each other in a perpendicular direction to the two surfaces. Here, the shape without the cutoff portions is not necessarily formed by cutting off of the portions, but may be formed by forming the same shape directly, for example. Further, the housing B21 has a polyhedral shape as the outer shape, includes plate-like surfaces, and is hollow. Note that the shape of the second base B2 (i.e., the shape of the housing B21) may be another shape as long as the second base B2 may be fixed to a part of the upper surface of the first base B1 (the surface MM1 in the example) in place of the shape.

The movable unit A includes a first arm A1 rotatably supported by the base B (more specifically, the first base B1) about a first rotation axis AX1, a second arm A2 rotatably supported by the first arm A1 about a second rotation axis AX2, and a shaft S rotatably supported about a third rotation axis AX3 and translationally supported in the axis direction of the third rotation axis AX3 by the second arm A2.

The shaft S is an axial member having a cylindrical shape. A ball screw groove and a spline groove (not shown) are respectively formed in the circumferential surface of the shaft S. In the example, the shaft S is provided to penetrate an opposite end portion to the first arm A1 of the end portions of the second arm A2 in a second direction as a direction perpendicular to the installation surface when the base B is installed on the installation surface. The second direction is e.g. a direction along the Z-axis in the robot coordinate system RC shown in FIG. 1. Note that the second direction may be a direction not along the Z-axis in place of the direction along the Z-axis. An end effector can be attached to the end portion on the installation surface side of the end portions of the shaft S. The end effector may be an end effector that can hold an object with finger portions, an end effector that can hold an object by suction by air or magnetic force, or another end effector. In the embodiment, an object is held so that the object can be lifted up.

The first arm A1 includes at least a housing A11 of the first arm A1. In the example, the housing A11 has a nearly rectangular parallelepiped shape, includes plate-like surfaces, and is hollow. The shape of the housing A11 may be another shape instead.

In the example, the first arm A1 rotates about the first rotation axis AX1 and moves in a third direction. The third direction is a direction orthogonal to the above described second direction. The third direction is e.g. a direction along an XY-plane as a plane formed by an X-axis and a Y-axis in the above described robot coordinate system RC. Note that the third direction may be a direction not along the XY-plane in place of the direction along the XY-plane.

Further, the first arm A1 is rotated (driven) about the first rotation axis AX1 by a drive unit M1 of the base B. The drive unit M1 is e.g. a servo motor. That is, in the example, the first rotation axis AX1 is an axis that coincides with a drive axis of the drive unit M1. Note that the drive unit M1 may be another member that can rotate the first arm A1 about the first rotation axis AX1 in place of the servo motor. The drive unit M1 may be integrally formed with at least one of an encoder that detects the rotation angle of the drive unit M1 and an amplifier part including a drive circuit that drives the drive unit M1, or may be formed separately from both the encoder that detects the rotation angle of the drive unit M1 and the amplifier part including the drive circuit that drives the drive unit M1. As below, as an example, the case where the drive unit M1 is integrally formed with both the encoder and the amplifier part will be explained. Or, the first rotation axis AX1 and the drive axis of the drive unit M1 do not necessarily coincide. In this case, for example, the drive unit M1 rotates the first arm A1 about the first rotation axis AX1 by a method using a pulley and a belt or the like.

The second arm A2 includes at least a housing A21 of the second arm A2. The housing A21 has a shape as an outer shape formed by cutting off to remove triangular portions containing single vertexes in two surfaces forming a rectangular parallelepiped shape (or cubic shape) and opposed to each other in a perpendicular direction to the two surfaces. Here, the shape without the cutoff portions is not necessarily formed by cutting off of the portions, but may be formed by forming the same shape directly, for example. Further, the housing A21 has a polyhedral shape as the outer shape, includes plate-like surfaces, and is hollow. Note that the shape of the housing A21 may be another shape instead.

In the example, the second arm A2 rotates about the second rotation axis AX2 and moves in the third direction. The second arm A2 is rotated about the second rotation axis AX2 by a drive unit M2 of the second arm A2. The drive unit M2 is a member that can rotate the second arm A2 about the second rotation axis AX2 e.g. a servo motor. That is, in the example, the second rotation axis AX2 is an axis that coincides with a drive axis of the drive unit M2. Note that the drive unit M2 may be another member that can rotate the second arm A2 about the second rotation axis AX2 in place of the servo motor. The drive unit M2 may be integrally formed with at least one of an encoder that detects the rotation angle of the drive unit M2 and an amplifier part including a drive circuit that drives the drive unit M2, or may be formed separately from both the encoder that detects the rotation angle of the drive unit M2 and the amplifier part including the drive circuit that drives the drive unit M2. As below, as an example, the case where the drive unit M2 is formed integrally with both the encoder and the amplifier part will be explained. Or, the second rotation axis AX2 and the drive axis of the drive unit M2 do not necessarily coincide. In this case, for example, the drive unit M2 rotates the second arm A2 about the second rotation axis AX2 by a method using a pulley and a belt or the like.

Further, the second arm A2 includes a drive unit M3 and a drive unit M4 and supports the shaft S. The drive unit M3 moves the shaft S in the second directions (upward and downward) by turning the ball screw nut provided in the outer circumference part of the ball screw groove of the shaft S with a timing belt or the like. The drive unit M4 drives the shaft S about the third rotation axis AX3 by turning the ball spline nut provided in the outer circumference part of the spline groove of the shaft S with a timing belt or the like.

The drive unit M3 is a member that can move the shaft S in the second directions (upward and downward) by turning the ball screw nut provided in the outer circumference part of the ball screw groove of the shaft S with a timing belt or the like e.g. a servo motor. Note that the drive unit M3 may be another member that can move the shaft S in the second directions (upward and downward) by turning the ball screw nut provided in the outer circumference part of the ball screw groove of the shaft S with a timing belt or the like in place of the servo motor. The drive unit M3 may be integrally formed with at least one of an encoder that detects the rotation angle of the drive unit M3 and an amplifier part including a drive circuit that drives the drive unit M3, or may be formed separately from both the encoder that detects the rotation angle of the drive unit M3 and the amplifier part including the drive circuit that drives the drive unit M3. As below, as an example, the case where the drive unit M3 is formed integrally with both the encoder and the amplifier part will be explained.

The drive unit M4 is a member that can drive the shaft S about the third rotation axis AX3 by turning the ball spline nut provided in the outer circumference part of the spline groove of the shaft S with a timing belt or the like e.g. a servo motor. Note that the drive unit M4 may be another member that can drive the shaft S about the third rotation axis AX3 by turning the ball spline nut provided in the outer circumference part of the spline groove of the shaft S with a timing belt or the like in place of the servo motor. The drive unit M4 may be integrally formed with at least one of an encoder that detects the rotation angle of the drive unit M4 and an amplifier part including a drive circuit that drives the drive unit M4, or may be formed separately from both the encoder that detects the rotation angle of the drive unit M4 and the amplifier part including the drive circuit that drives the drive unit M4. As below, as an example, the case where the drive unit M4 is formed integrally with both the encoder and the amplifier part will be explained.

As below, as an example, the case where all of the respective drive unit M1 to drive unit M4 have the same configuration will be explained. Further, as below, the drive unit M1 to drive unit M4 will be explained collectively as drive units M unless distinction of the respective units is necessary. Note that part or all of the drive unit M1 to drive unit M4 may have different configurations from one another. Or, the robot 1 may have a configuration with three or less drive units M or five or more drive units in place of the configuration with the four drive units M.

The robot 1 is controlled by a robot control apparatus 30. The robot 1 contains the robot control apparatus 30 inside of the base B1 (i.e., inside of the housing B11). Note that the robot 1 may have a configuration containing the robot control apparatus 30 in another location (e.g. inside of the housing B21 or the like) inside of the robot 1.

The robot control apparatus 30 is a controller that controls the robot 1. The robot control apparatus 30 performs e.g. power supply to the respective four drive units M (i.e., the drive unit M1 to drive unit M4) and output of control signals to the four drive units M, and operates the robot 1.

Figure 2:
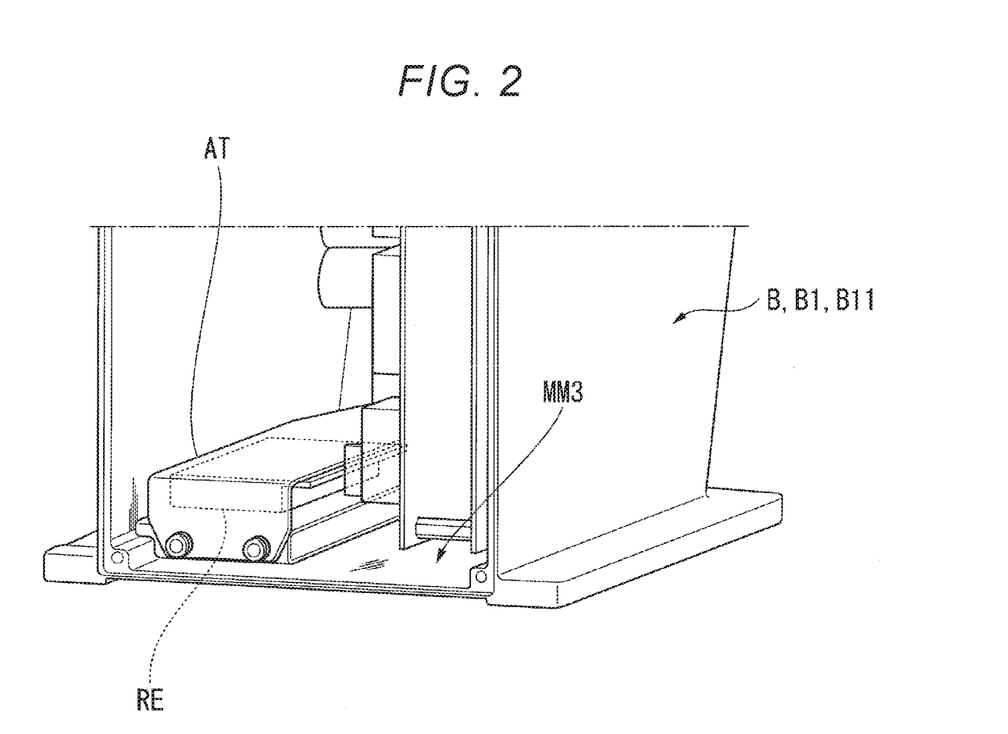

Further, the robot control apparatus 30 includes power supply units (not shown) that supply electric power to the respective four drive units M, a braking unit BK, and one conversion element RE (not shown in FIG. 1, see FIG. 2). The braking unit BK brakes the drive units M by short-circuiting between power lines (not shown) for supplying electric power from the power supply units to the drive units M with respect to each of the four drive units M. That is, the braking unit BK is a regenerative brake (dynamic brake). The drive units M braked by the braking unit BK generate regenerative currents flowing to the power supply units via the power lines connected to the drive units M. Note that the regenerative current is an example of a current generated by braking of the drive unit by the braking unit. Here, the robot control apparatus 30 includes one or more boards (not shown). The respective power supply units and braking unit BK are formed by various circuits provided on the one or more boards. Note that, on the one or more boards, other circuits are provided in addition to the various circuits forming the respective power supply units and braking unit BK, however, the explanation of the other circuits will be omitted.

The conversion element RE is connected to the power lines connected to the respective four drive units M. The conversion element RE is an element that converts the regenerative currents generated by braking of the respective four drive units M by the braking unit BK into heat. The conversion element RE is e.g. a resistor. Note that the conversion element RE may be any element that converts the regenerative currents generated by braking of the respective four drive units M by the braking unit BK into heat. The resistance value of the conversion element RE is e.g. from 2Ω to 1 kΩ. Note that the resistance value of the conversion element RE may be a value smaller than 2Ω or a value larger than 1 kΩ.

Further, the conversion element RE generates heat by converting the regenerative current into heat (for example, the element may generate heat to about 100° C.) Accordingly, in the robot 1, the conversion element RE is attached to the robot housing. This is because heat capacity of the robot housing in the robot 1 is larger than the heat capacity of the other members of the robot 1. Here, the robot housing refers to the housing of the robot 1. That is, the robot housing includes the housing of the movable unit A and the housing of the base B. The housing of the movable unit A includes the above described housing A11 of the first arm A1 and housing A21 of the second arm A2. The housing of the base B includes the above described housing B11 of the first arm B1 and housing B21 of the second arm B2.

For example, as shown in FIG. 2, the conversion element RE is attached to the robot housing by an attachment member AT. FIG. 2 shows an example of the conversion element RE attached to the robot housing by the attachment member AT. The attachment member AT may be any member that can attach the conversion element RE to the robot housing e.g. a fastening member such as a screw or a jig formed by a metal plate, which can attach the conversion element RE to the robot housing. In the example shown in FIG. 2, the attachment member AT is a jig formed by a metal plate. Note that it is desirable that the material of the attachment member AT is a material having higher thermal conductivity. Further, the shape of the attachment member AT may be another shape in place of the shape of the attachment member AT shown in FIG. 2 (box shape or container shape). The conversion element RE is attached by the attachment member AT, and thereby, in the robot 1, a temperature rise inside of the robot housing with the temperature rise of the conversion element RE may be suppressed by heat conduction between the conversion element RE and the robot housing. Note that the conversion element RE may have a configuration attached to the robot housing by another method using an adhesive agent or the like in place of the configuration attached to the robot housing by the attachment member AT.

In the example shown in FIG. 2, the conversion element RE is attached to the housing of the base B of the robot housing by the attachment member AT. Thereby, in the robot 1, the temperature rise inside of the robot housing with the temperature rise of the conversion element RE may be suppressed more reliably by heat conduction between the conversion element RE and the housing of the base B. Note that the conversion element RE may be attached to the housing of the movable unit A by the attachment member AT not to the housing of the base B. The housing of the movable unit A includes the housing of the first arm A1 and the housing of the second arm A2.

More specifically, in the example shown in FIG. 2, the conversion element RE is attached to a surface MM3 as a bottom surface of the base B of the housing of the base B (i.e., the bottom surface of the housing B11 of the first base B1) by the attachment member AT. When the base B is installed on the installation surface, the surface MM3 refers to a lower surface of the inner surfaces of the housing B11. That is, the surface MM3 is a surface having the largest heat capacity of the surfaces of the robot housing because the surface on the installation surface side of the surfaces of the plate-like member forming the surface MM3 (i.e., the above described lower surface of the first base B1) is in surface contact with the above described installation surface. Accordingly, in the robot 1, the temperature rise inside of the robot housing with the temperature rise of the conversion element RE may be suppressed more reliably by heat conduction between the conversion element RE and the surface MM3. Note that the conversion element RE may be attached to another surface of the housing of the base B not to the surface MM3. Specifically, the conversion element RE may be attached to another surface than the surface MM3 of the surfaces of the housing B11 of the first member B1, may be attached to any surface of the housing B21 of the second member B2, or may be attached to the housing of the base B over the surface of the housing B11 of the first member B1 and the surface of the housing B21 of the second member B2.

Further, it is desirable that the conversion element RE is provided separately from the one or more boards of the robot control apparatus 30 to suppress a temperature rise of the one or more boards of the robot control apparatus 30 with the temperature rise of the conversion element RE. Accordingly, in the example shown in FIG. 2, the conversion element RE is not attached onto any of the one or more boards of the robot control apparatus 30, but attached to the above described surface MM3 by the attachment member AT. Thereby, in the robot 1, the temperature rise of the one or more boards of the robot control apparatus 30 with the temperature rise of the conversion element RE may be suppressed. Note that the conversion element RE may be attached to at least a part of the one or more boards. In this case, the conversion element RE is attached to the robot housing together with the board with the conversion element RE attached thereto.

In the example shown in FIG. 2, the conversion element RE is located inside of the housing B11 of the first base B1. That is, the conversion element RE is located inside of the robot housing. Thereby, in the robot 1, contact between another object outside of the robot 1 and the conversion element RE may be suppressed. However, in the case where the conversion element RE is located inside of the housing B11 of the first base B1, the conversion element RE may come into contact with various wire members (not shown) of the robot control apparatus 30. The wire members refer to various wires of the robot control apparatus 30 in the example, and include the power lines connected to the respective drive units M etc. When the wire members and the conversion element RE are in contact, the temperature of the wire members rises with the temperature rise of the conversion element RE. To suppress the temperature rise of the wire members, it is desirable that the wire members are not in contact with the conversion element RE. Accordingly, in the robot 1, the attachment member AT is located between the conversion element RE and the wire members. Thereby, the contact of the wire members with the conversion element RE is hindered by the attachment member AT. As a result, in the robot 1, the temperature rise of the wire members with the temperature rise of the conversion element RE may be suppressed by the attachment member AT. Note that, in the robot 1, the attachment member AT is not necessarily located between the conversion element RE and the wire members. In this case, in the robot 1, a contact suppression member separate from the attachment member AT may be provided or not. The contact suppression member is a member located between the conversion element RE and the wire members to suppress the contact between the the conversion element RE and the wire members. In the case where the robot 1 includes the contact suppression member, in the robot 1, the temperature rise of the wire members with the temperature rise of the conversion element RE may be suppressed by the contact suppression member.

Further, in the example shown in FIG. 2, the conversion element RE is separated from the above described surface MM3 (i.e., the robot housing). That is, in the example, the conversion element RE is attached to the surface MM3 not to come into contact with the surface MM3 by the attachment member AT. Thereby, in the robot 1, the temperature rise of inside of the robot housing with the temperature rise of the conversion element RE may be suppressed by heat conduction between the conversion element RE and the robot housing via the attachment member AT. Note that the conversion element RE may be in contact with the surface MM3 (i.e., the robot housing). That is, the conversion element RE may be attached to the surface MM3 to come into contact with the surface MM3 by the attachment member AT. In this case, in the robot 1, the temperature rise inside of the robot housing with the temperature rise of the conversion element RE may be suppressed by respective heat conduction between the conversion element RE and the robot housing, heat conduction between the conversion element RE and the attachment member AT, and heat conduction between the attachment member AT and the robot housing. Or, the conversion element RE may be in contact with the surface MM3 via a heat dissipation sheet. That is, in the robot 1, the conversion element RE may be in contact with the heat dissipation sheet and the heat dissipation sheet may be in contact with the surface MM3 (i.e., the robot housing). In this case, in the robot 1, the temperature rise inside of the robot housing with the temperature rise of the conversion element RE may be suppressed more reliably by the heat dissipation sheet. Note that the heat dissipation sheet may be any heat dissipation sheet.

Here, as described above, the robot control apparatus 30 in the example converts the regenerative currents generated by braking of the respective four drive units M by the braking unit BK into heat using the single conversion element RE. Thereby, regarding the robot 1, at least part of reduction in weight, suppression of increase in manufacturing cost, and reduction in size may be realized. Note that the robot control apparatus 30 may have a configuration that converts the regenerative currents generated by braking of the respective four drive units M by the braking unit BK into heat by two or more conversion elements RE.

As described above, the resistance value of the conversion element RE in the example is from $2\Omega$ to $1\ k\Omega$. Further, the conversion element RE is attached to the robot housing. Thereby, in the robot 1, the temperature rise inside of the robot housing with the temperature rise of the conversion element RE may be suppressed by the heat conduction between the conversion element RE having the resistance value from $2\Omega$ to $1\ k\Omega$ and the robot housing.

Returning to FIG. 1, a teaching apparatus (not shown) for teaching the operation of the robot 1 to the robot control apparatus 30 may be connected to the robot control apparatus 30. Accordingly, the robot 1 includes a connection part CN that can connect the robot control apparatus 30 and the teaching apparatus. The connection part CN is e.g. a connector. A user connects between the teaching apparatus and the connection part CN by a wire, and thereby, may communicably connect the teaching apparatus and the robot control apparatus 30. Note that the connection part CN may be any member for connecting the robot control apparatus 30 and the teaching apparatus. Hereinafter, for convenience of explanation, of the surfaces of the first base B1 (i.e., the surfaces of the housing B11), the surface on the side in a fourth direction as a direction associated with the first base B1 is referred to as "back surface" of the first base B1. The fourth direction refers to a direction orthogonal to the above described first direction from the first rotation axis AX1 toward the boundary line between the above described surface MM1 and surface MM2. Further, hereinafter, for convenience of explanation, of the surfaces of the second base B2 (i.e., the surfaces of the housing B21), the surface on the side in the fourth direction is referred to as "back surface" of the second base B2.

The connection part CN is provided in a region RG as a region surrounded by dotted lines in FIG. 1 between the surface MM2 and the bottom surface of the housing of the first base B1 when the back surface of the first base B1 is seen in the opposite direction to the fourth direction (i.e., the direction orthogonal to the back surface) of the region contained in the back surface of the first base B1. Thereby, in the robot 1, the number of wires passing through the portion in which the base B is thinner (the boundary portion connecting the inside of the first base B1 and the inside of the second base B2) of the portions of the base B may be reduced when the base B is seen in the opposite direction to the first direction compared to the case where the connection part CN is provided on the back surface of the second base B2. As a result, the movable range of the movable unit A provided on the surface MM2 may be expanded. Note that it is desirable that the location in which the connection part CN is provided in the region RG is on the upper side.

Further, an inductance element for reducing noise may be provided or not in addition to the conversion element RE in the power lines connecting the power supply units and the respective drive units M explained as above. The inductance element refers to an element having inductance e.g. a coil. Note that the inductance element may be any element having inductance in place of the coil.

As described above, the robot 1 includes a robot housing containing a robot control apparatus (the robot control apparatus 30 in the example) that controls the robot 1 having a drive unit (the drive units M in the example), a braking unit (the braking unit BK in the example) that brakes the drive unit by short-circuiting between power lines for supplying electric power to the drive unit, and a conversion element (the conversion element RE in the example) that converts a current generated by braking of the drive unit by the braking unit into heat, and the conversion element is attached to the robot housing. Thereby, in the robot 1, increase in installation area may be suppressed and a temperature rise inside of the robot housing with a temperature rise of the conversion element may be suppressed.

In the robot 1, the conversion element is not attached to any of one or more boards of the robot control apparatus. Thereby, in the robot 1, a temperature rise of the one or more boards of the robot control apparatus with the temperature rise of the conversion element may be suppressed.

In the robot 1, the conversion element is attached to the robot housing by an attachment member (the attachment member AT in the example) as a member that attaches the conversion element to the robot housing. Thereby, in the robot 1, the temperature rise inside of the robot housing with the temperature rise of the conversion element may be suppressed by heat conduction between the conversion element and the robot housing.

In the robot 1, the conversion element and the robot housing are separated. Thereby, in the robot 1, the temperature rise inside of the robot housing with the temperature rise of the conversion element may be suppressed by the heat conduction between the conversion element and the robot housing via the attachment member.

In the robot 1, the conversion element and the robot housing are in contact. Thereby, in the robot 1, the temperature rise inside of the robot housing with the temperature rise of the conversion element may be suppressed by respective heat conduction between the conversion element and the robot housing, heat conduction between the conversion element and the attachment member, and heat conduction between the attachment member and the robot housing.

In the robot 1, the conversion element is in contact with a heat dissipation sheet, and the heat dissipation sheet is in contact with the robot housing. Thereby, in the robot 1, the temperature rise inside of the robot housing with the temperature rise of the conversion element may be suppressed more reliably by the heat dissipation sheet.

In the robot 1, the conversion element is a resistor. Thereby, in the robot 1, the increase in installation area may be suppressed, and the temperature rise inside of the robot housing with a temperature rise of the resistor may be suppressed by heat conduction between the resistor and the robot housing.

Further, the robot 1 includes a base (the base B in the example) and a movable unit (the movable unit A in the example) provided on the base. In the robot 1, the robot housing includes a housing of the base (the respective housing B11 and housing B21 in the example) and a housing of the movable unit (the respective housing A11 and housing A21 in the example), and the conversion element is attached to the housing of the base. Thereby, in the robot 1, the temperature rise inside of the robot housing with the temperature rise of the conversion element may be suppressed more reliably by heat conduction between the conversion element and the housing of the base.

In the robot 1, the conversion element is attached to a bottom surface (the surface MM3 in the example) of the housing of the base. Thereby, in the robot 1, the temperature rise inside of the robot housing with the temperature rise of the conversion element may be suppressed more reliably by heat conduction between the conversion element and the bottom surface of the housing of the base.

Furthermore, in the robot 1, the base includes a first base (the first base B1 in the example) and a second base (the second base B2 in the example), the second base is provided on a first surface (the surface MM1 in the example) as a part of a surface on a side in a first direction as a direction associated with the first base of surfaces of the first base, a gap is formed between a second surface (the surface MM2 in the example) as a surface different from the first surface of the surface on the side in the first direction of the surfaces of the first base and the second base, the movable unit is provided on the second surface or second base in the gap, and a connection part (the connection part CN in the example) that can be connected to a teaching apparatus is provided in a region (the region RG in the example) between the second surface and the bottom surface of the housing of the first base when a back surface of the housing of the first base is seen in a direction orthogonal to the back surface of a region of the back surface. In the robot 1, a movable range of the movable unit may be expanded.

In the robot 1, the conversion element is located inside of the robot housing. Thereby, in the robot 1, contact between another object outside of the robot and the conversion element may be suppressed.

Further, the robot 1 includes a contact suppression member located between the conversion element and a wire member. Thereby, in the robot 1, a temperature rise of the wire member with the temperature rise of the conversion element may be suppressed by the contact suppression member.

In the robot 1, the attachment member is located between the conversion element and the wire member. Thereby, in the robot 1, the temperature rise of the wire member with the temperature rise of the conversion element may be suppressed by the attachment member.

In the robot 1, a resistance value of the conversion element is from $2\Omega$ to $1\ k\Omega$. Thereby, in the robot 1, the temperature rise inside of the robot housing with the temperature rise of the conversion element may be suppressed by heat conduction between the conversion element having the resistance value from $2\Omega$ to $1\ k\Omega$ and the robot housing.

Furthermore, the robot 1 includes a plurality of drive units (the four drive units M in the example). In the robot 1, the braking unit brakes the respective plurality of drive units by short-circuiting between power lines for supplying electric power to the drive units, and the conversion element converts the currents generated by braking of the respective plurality of drive units by the braking unit into heat. Thereby, regarding the robot 1, at least part of reduction in weight, suppression of increase in manufacturing cost, and reduction in size may be realized.

As above, the embodiments of the invention are described in detail with reference to the drawings, however, the specific configurations are not limited to the embodiments and changes, replacements, deletions, etc. may be made without departing from the scope of the invention.

The entire disclosure of Japanese Patent Application No. 2017-222482, filed Nov. 20, 2017 is expressly incorporated by reference herein.

What is claimed is:

1. A robot comprising:
a base having a first base and a second base, the second base being provided on a first surface of the first base, a gap being formed between the first base and the second base,
an arm provided on the base, the arm being provided on a second surface of the first base or the second base in the gap;
a robot housing defining an internal space, the internal space containing a robot control apparatus that controls the robot having a motor, and the robot housing including a housing of the base and a housing of the arm;
a connector that can be connected to a teaching apparatus is provided in a region of a back surface of the housing of the first base, the region being between the second surface and a bottom surface of the housing of the first base when seen in a direction orthogonal to the back surface;
a brake that brakes the motor by short-circuiting between power lines for supplying electric power to the motor; and
a conversion element that converts a current generated by braking of the motor by the brake into heat, the conversion element being disposed in the internal space and attached to an inner wall of the robot housing by a covering fixed to the robot housing, and the conversion element being attached to the bottom surface of the housing of the base.

2. The robot according to claim 1, wherein the conversion element is not attached to any of one or more boards of the robot control apparatus.

3. The robot according to claim 1, wherein the conversion element and the robot housing are separated.

4. The robot according to claim 1, wherein the conversion element and the robot housing are in contact.

5. The robot according to claim 1, wherein the conversion element is in contact with a heat dissipation sheet, and
the heat dissipation sheet is in contact with the robot housing.

6. The robot according to claim 1, wherein the conversion element is a resistor.

7. The robot according to claim 1, wherein the conversion element is located inside of the robot housing.

8. The robot according to claim 1, further comprising a contact suppression member located between the conversion element and a wire member.

9. The robot according to claim 1, wherein the covering is located between the conversion element and a wire member.

10. The robot according to claim 1, wherein a resistance value of the conversion element is from $2\Omega$ to $1\ k\Omega$.

11. The robot according to claim 1, wherein the motor is one of a plurality of motors,
wherein the brake brakes the respective plurality of motors by short-circuiting between power lines for supplying electric power to the plurality of motors, and the conversion element converts currents generated by braking of the respective plurality of motors by the brake into heat.

\* \* \* \* \*